United States Patent Office 3,383,391
Patented May 14, 1968

3,383,391
IMIDE TERMINATED POLYAMIDE RESINS
USEFUL IN INKS
Daniel J. Carlick, Berkeley Heights, Arnold H. Gruben, Cedar Grove, and Samuel B. McFarlane, Jr., Summit, N.J., and William J. Kissel, New York, N.Y., assignors to Sun Chemical Corporation, New York, N.Y., a corporation of Delaware
No Drawing. Filed Dec. 19, 1963, Ser. No. 331,929
14 Claims. (Cl. 260—326)

ABSTRACT OF THE DISCLOSURE

Novel polyamide compositions are prepared by reacting certain chain terminating agents, such as an hydrogenated phthalic acid or anhydride with polyamines and exhibit increased solution stability and solubility.

This invention relates to new compositions of matter, particularly to novel synthetic polyamides and more particularly to modified synthetic polyamides possessing improved stability and solubility characteristics.

It is well known to those skilled in the art that requirements imposed on ink compositions and the like are so severe and critical that very few, if any, other applications for resinous materials set as high as standard. For instance, the film must be both tough and hard in order to withstand the severe physical abuse to which it is subjected in service, and at the same time must also withstand abrasion and bending stresses encountered without disrupting from the printed surface.

Other conditions must be met by a resinous composition before it can be considered entirely satisfactory for employment in inks and the like. It must be capable of being dissolved in commercially available solvents to produce ink compositions having a relatively high resin solids content without excessive viscosity. Ink compositions so prepared should exhibit stability in storage for long periods of time so that marked changes or precipitation do not occur. The ink compositions when applied to paper or the like should be capable of being dried within a reasonably short period of time. The applied ink composition should be smooth and free from pinholes or other flaws.

Heretofore, it was difficult to obtain uniform compositions containing a polyamide, due to the fact that a majority of the polyamides known to the art were either insoluble or non-compatible with the other components in the respective compositions.

In the case of printing inks, it was found desirable to incorporate polyamide resins as a binding agent. However, many of the resins heretofore known were either incompatible with the ink composition or the solvents incorporated therein and/or were too brittle and would not produce a desirable film after the ink was dried. In addition, some of the resins heretofore employed in ink compositions caused flocculation of the vehicle, thus causing the ink to coagulate and in some instances to become non-liquid. Consequently, it was heretofore necessary to use in the ink vehicle an aliphatic hydrocarbon solvent within which the polyamide resin was soluble before the resin could be employed in ink compositions. However, aside from the added expense, it was found that these hydrocarbon solvents were not satisfactory since they attacked the conventional rubber plates and rolls of printing machinery. Furthermore, the polyamide resins heretofore produced were not generally acceptable as binding agents in ink compositions due to their lack of substantial solubility and solution stability in alcohols.

Therefore, it is a primary object of the present invention to prepare novel polyamides.

Another object of this invention is to prepare polyamides which are compatible in ink compositions.

Another object of this invention is to prepare polyamides which have an improved alcohol solubility.

Still another object of this invention is to prepare a polyamide which is compatible with nitrocellulose.

Still another object of this invention is to prepare a polyamide which is compatible with inorganic and organic pigments.

Still another object of this invention is to prepare a polyamide, which produces flexible films having excellent adhesive characteristics.

A still further object of this invention is to prepare a polyamide substantially free of an amine odor.

A still further object of the invention is to prepare a polyamide which may be incorporated in printing inks.

A still further object of this invention is to prepare a polyamide which is compatible with other resins normally present in inks and solutions thereof.

These and other objects have been achieved by reacting certain chain terminating agents with polycarboxylic acids and polyamines to yield a polyamide product having both desirable chemical and physical characteristics. Chain terminating agents such as aromatic carboxylic acids and anhydrides thereof, and particularly hydrogenated aromatic carboxylic acids, may be employed in the preparation of the novel polyamides.

The expression "aromatic and polycarboxylic acids" as used herein refers to carboxylic acids composed of carbon, hydrogen, and oxygen wherein the oxygen is present in the carboxyl group.

The term "polyamines" as used herein implies an amine containing at least two amino groups, which may be represented by the formula $H_2N(RNH)_xH$, wherein R is an alkylene radical having from 1 to 8 carbon atoms and $x$ is an integer of from 1 to 6.

In general, the novel polyamides embodied herein are prepared by reacting a mixture of polycarboxylic acids having more than one functional acid group with a polyamine in the presence of an aromatic polycarboxylic acid or anhydrides thereof. The polycarboxylic acids should be reacted with the polyamine in sufficient amounts to provide a ratio of carboxyl groups to amino groups in the range of from about 0.6 to about 0.9. The aromatic polycarboxylic acid or anhydrides thereof should be present in sufficient amounts to provide a ratio of carboxyl groups from the aromatic polycarboxylic acid to amino groups of from about 0.05 to about 0.3, preferably about 0.1, to substantially neutralize the excess amino groups present. However, the ratio of the total carboxyl groups from both the aromatic and polycarboxylic acids to the amino groups from the polyamine should be from about 0.6 to about 0.9. These reactions should be carried out at a temperature of between about 100° C. to about 500° C. with a pressure of less than atmospheric up to about 1000 p.s.i. with a reaction time of up to 10 hours. The novel polyamides thus prepared have from about 1.8 to about 2.0 functional carboxyl and amine groups per mol.

In carrying out our invention, the polycarboxylic acids may be reacted with the polyamine prior to the addition of the aromatic polycarboxylic acid or anhydrides thereof, or all the reactants may be combined and reacted at an elevated temperature. In either case, any high molecular weight fatty acid of 8 or more carbon atoms such as linoleic, linolenic, stearic, octadecadienoic acids, and the $C_{20}$, $C_{22}$, $C_{24}$ and $C_{26}$ fatty acids may be employed. Also fatty acid derivatives such as esters, acid anhydrides, and acylhalides of such fatty acids may be employed. These fatty acids and their derivatives may be obtained from any suitable source. The vegetable and marine oils are good sources, and the fatty acids derived from such sources vary from 14 to 26 carbon atoms. Dehydrated castor oil, linseed oil, china-wood, soya bean, sunflower, and cotton seed oils, sardine, herring, whale, and menhaden fish oils are very good sources of oils which may be utilized. Hydrolysis of these oils yields an acid mixture which contains the desired polycarboxylic acids. The mixtures obtained from the hydrolysis of these oils may be reacted with the polyamine in carrying out this invention, but preferably these acid mixtures should be first subjected to a fractional separation treatment to remove at least a portion of the saturated and mono-unsaturated acids. In one method of removing a portion of the saturated and mono-unsaturated acids, the acid mixture may be cooled while admixed with a solvent such as acetone, methyl alcohol, propane, hexane or liquid ammonia, until a portion crystallizes. The crystallized portion is separated and the uncrystallized portion may be freed of solvent and reacted with the polyamine.

Suitable polycarboxylic acids also include the dimers and trimers of olefinically unsaturated monocarboxylic acids having 10 to 20 carbon atoms, preferably 15 to 18 carbon atoms to the molecule, which acids may be the same or different in the dimer or trimer molecule, for example, undecylenic acid, oleic, linoleic, and linolenic acids. Illustratively, suitable polycarboxylic acids having more than one carboxyl group may be obtained from the polymerization of drying or semi-drying oils which are rich in linoleic acids, e.g., soybean, tung, linseed, perilla, cottonseed, corn, sunflower, safflower, and dehydrated castor oils. As a practical matter, the result of polymerization of unsaturated monocarboxylic acids to produce polycarboxylic acids results in mixtures containing, for example, dimers and trimers. One such product is Empol "1018" as sold by Emery Industries, Incorporated, which contains a major proportion of di-linoleic acid (about 83 weight percent) and a minor proportion of tri-linoleic acid (about 17 weight percent).

The polyamines which may be employed for reaction with the polycarboxylic acids are those having the formula $H_2N(RNH)_xH$, where R is an alkylene radical having from 1 to 8 carbon atoms. Preferably, the polyamines contemplated for usage herein are those of relatively short chain length, as for example, a chain length of from about 1 to 8 carbon atoms, preferably having from about 2 to 6 carbon atoms per molecule. Examples of polyamines which may be reacted with the polycarboxylic acids are ethylene diamine, trimethylene diamine, tetramethylene diamine, pentamethylene diamine and hexamethylene diamine, diethylene triamine, triethylene tetramine, tetramethylene pentamine, 1,4-diaminobutane, 1,3-diaminobutane, 3-(N-isopropylamino) propylamine, 3,3'-imino-bispropylamine, and the like.

The stabilization of the polyamide resins is obtained by the inclusion of a small amount of an aromatic polycarboxylic acid or anhydride thereof. As a chain terminating agent, the polycarboxylic acid or anhydride thereof reacts with the free amine groups to form imide groups which render the amine groups unavailable for further reaction with other polycarboxylic acid groups. A variety of aromatic carboxylic acids may be employed as chain terminating agents, particularly hydrogenated aromatic polycarboxylic acids having from about 8 carbon atoms to the molecule. For example, suitable aromatic polycarboxylic acids which can be employed are phthalic acid, tetrahydrophthalic acid, hexahydrophthalic acid, "nadic" acid, and anydrides thereof. Only a small quantity of the acid is necessary to act as a chain terminating agent. In cases where the total amine value of the polyamide resin is to lie between 1 and 25, the quantity of acid employed should be sufficient to neutralize most of the amine groups. It is preferred that the polyamides prepared herein have an amine value of from 3 to 15 and more preferably from 10 to 12.

In the preparation of the novel polyamides, the resin composition should have free acid groups and the relative number of these may be referred to as the acid number or acid value. Thus the polyamides must have an acid value of at least 1 and preferably should have an acid value of from 5 to 8. The ratio of total acid value to total amine value of the novel polyamides must be in the range of 0.6 to 0.9, and more preferably in the range of from 0.70 to 0.85. The polyamide composition thus described will have an average per mol functionality of between 1.8 to 2.0. By the term "functionality" we mean the number of reactive carboxy groups and amine groups per mol of polyamide product.

The ratio of the reactants is critical in order to obtain a novel polyamide having desirable chemical and physical properties. The reaction of the polycarboxylic acid with a polyamine should be in such a ratio that the carboxyl groups to amine groups will be in the range of from about 0.6 to 0.9, preferably between 0.7 to about 0.8. The amount of aromatic polycarboxylic acid or anhydrides thereof employed as a chain terminating agent should be sufficient to provide a ratio of carboxyl groups (from the aromatic polycarboxylic acid) to amino groups of about 0.05 to about 0.3, preferably about 0.1. However, a sufficient amount of the aromatic polycarboxylic acid should be employed to neutralize most of the amine groups. The ratio of the total acid value to amine value of the resin product should be in the range of 0.6 to about 0.9, preferably in the range of 0.70 to about 0.85.

A solvent may be employed in the reaction; however, in some cases it is not desirable. The solvent, if used, should be miscible with the carboxylic acids, polyamines, and their products. Also, the solvent must be chemically inert to the reactants and should be substantially free of water or other materials which are capable of reacting with the carboxylic acids, amines, and their products. Examples of chemically inert solvents which may be incorporated in this reaction are saturated aliphatic and aromatic hydrocarbons and acids thereof. Examples of solvents which may be employed are hexane, heptane, octane, nonane, decane, cyclohexane, isooctane, toluene, xylene, etc.

The temperature employed covers a range of from about 100° C. to about 500° C., with the preferred ranges being dependent upon the type of reactants employed in the reaction. It is usually desirable to initially heat the materials at a temperature of at least 100° C. and preferably from about 130° C. to about 200° C., but here again the temperature should be low enough to avoid degradation of the reaction products by heat alone.

The use of pressure above as well as below atmospheric may be employed, with the preferred pressure being from below atmospheric up to 1000 p.s.i., and more preferably from below atmospheric up to about 200 p.s.i.

In the novel polyamides thus prepared wherein a polycarboxylic acid is reacted with a polyamine in the presence of a chain terminating aromatic polycarboxylic acid or anhydride thereof, the chain terminating agent reacts with the terminal amine groups to form an imide group which effectively controls the average molecular weight of the polyamide. In addition to controlling the average molecular weight, these chain terminating agents tend to minimize the hydrogen bonding potential and cross-linking which naturally occur between adjacent polyamide chains, and thereby enhance the solution stability and solubility of the modified polyamides in alcohol.

In order to further describe the invention, but without intent of limitations, the following illustrative embodiment is set forth. In the preparation set forth, the reaction was carried out under a blanket of inert gas in a polymerization reaction vessel heated to suitable reaction temperature.

Example 1

|  | Mols | Equivalents |
|---|---|---|
| Di-linoleic acid, 83% by weight / Tri-linoleic acid, 17% by weight } Empol 1018 | 0.36 | 0.72 |
| Ethylene diamine (98%) | 0.49 | 0.98 |
| Hexahydrophthalic anhydride | 0.05 | 0.10 |
| Isooctanoic acid | 0.18 | 0.18 |

A reactor was purged with an inert gas, then charged with 0.72 equivalent of a polymeric acid mixture comprising about 83% di-linoleic acid and 17% tri-linoleic acid, 0.10 equivalent hexahydrophthalic anhydride and isooctanoic acid. The reactants were mixed and heated in an enclosed reactor which was provided with a trap for collecting water to a temperature of between 100–140° C. for an hour under an inert atmosphere. About 0.98 equivalent of ethylene diamine were added dropwise to the reactor over a period of ½ to 3 hours, while maintaining the temperature between about 100 to 140° C. After the addition of the ethylene diamine had been completed, the temperature was raised to about 200° C. and water of condensation was removed through the trap. When about 80 to about 85 percent of the theoretical water was distilled off, the acid and amine values of the reaction mass were determined and adjusted to between 0.75 and 0.85 by the addition of either ethylene diamine or Empol "1018." The reaction mass was held at 200° C. until an acid value of 10–15 was obtained. After an acid value of 10–15 was obtained, a vacuum was applied to the reaction mass and held until the acid value dropped to between about 5 to 10. After an acid value of from 5 to 10 was reached, the vacuum was released and the reactor contents cooled to 190° C. in the presence of an inert atmosphere. The polyamide reaction product recovered therefrom had a melting point range of about 92°–96° C., an acid value of 5 to 10, and an amine value of 6–12.

Examples 2 through 9

In Examples 2 through 9, a reactor was purged with an inert gas, then charged with a polymeric acid mixture comprising about 83% di-linoleic acid and 17% tri-linoleic acid, hexahydrophthalic anhydride and isooctanoic acid. The reactants were heated to a temperature of from about 100° C. to 140° C. under an inert atmosphere. The ethylene diamine was added dropwise to the reactor over a period of from about ½ to 3 hours, while maintaining the temperature between about 100° C. to 140° C. After the addition of the ethylene diamine has been completed, the temperature was raised to about 200° C. After approximately 80 to 85% of the water was distilled off, the acid and amine values of the reaction mass were determined and adjusted between 0.75 and 0.85 by the addition of either ethylene diamine or Empol "1018." The temperature was maintained at about 200° C. until an acid value of from 10–15 was obtained, and then a vacuum was applied to the reaction mass until the acid value dropped to about 5 to 10. The reactor contents were cooled to 190° C. and the polyamide reaction product recovered therefrom.

Table I illustrates the mols of polyamine and polycarboxylic acids reacted in Examples 2 through 9.

TABLE I
[Reactants (mols)]

| Examples | 2 | 3 | 4 | 5 | 6 | 7 | 8 | 9 |
|---|---|---|---|---|---|---|---|---|
| Di-linoleic acid 83% by weight / Tri-linoleic acid 17% by weight | 0.36 | 0.40 | 0.36 | 0.36 | 0.35 | 0.35 | 0.31 | 0.36 |
| Ethylene diamine (98%) | 0.52 | 0.52 | 0.51 | 0.50 | 0.49 | 0.50 | 0.47 | 0.45 |
| Hexahydrophthalic anhydride | 0.05 | 0.05 | 0.05 | 0.05 | 0.10 | 0.15 | 0.10 | 0.05 |
| Isooctanoic acid | 0.18 | 0.10 | 0.18 | 0.18 | 0.18 | | 0.18 | 0.18 |

Illustrated in Table II are the chemical and physical properties of the polyamides thus produced in Examples 2 through 9.

TABLE II
[Properties of the Polyamides]

| Examples | 2 | 3 | 4 | 5 | 6 | 7 | 8 | 9 |
|---|---|---|---|---|---|---|---|---|
| Melting Point, °C | 90 | 95 | 91 | 94 | 88 | 84 | 87 | 95 |
| Acid Value | 5.3 | 3.6 | 6.1 | 4.8 | 8.5 | 2.0 | 5.3 | 8.8 |
| Amine Value | 20.0 | 15.1 | 16.7 | 12.8 | 7.7 | 22.8 | 13.1 | 3.1 |
| Functionality | 1.88 | 1.95 | 1.88 | 1.88 | 1.88 | 2.04 | 1.87 | 1.87 |
| Solubility, Dilution to Cloud Point: | | | | | | | | |
| Anhydrous Ethanol, percent | 25.5 | >40 | 31.5 | 33.6 | 31.2 | 33.5 | 22.4 | >40 |
| Ethanol, 190 Proof, percent | 6.0 | >40 | 7.1 | 10.5 | 9.9 | 13.3 | <5 | 19.8 |
| 99% Isopropanol, percent | <5 | <5 | <5 | <5 | <5 | <5 | <5 | <5 |

Other aromatic polycarboxylic acids, such as phthalic acid, tetrahydrophthalic acid, "nadic" acid, and anhydrides thereof, were employed in this reaction with substantially the same results.

The novel polyamides thus produced were found to be compatible in printing ink compositions in the range of from about 2 to 40 parts by weight and may be incorporated therein as binding agents without causing decomposition of the rubber rolls and plates of printing machinery. A representative example of an ink formulation containing the polyamides of the instant invention is illustrated hereinbelow. The respective components of the ink composition are represented as parts by weight.

Components:

| | |
|---|---|
| Barium lithol pigment | 16.00 |
| Armid O | 0.60 |
| Polyethylene wax | 2.50 |
| Polyamide resin | 30.00 |
| VM & P naphtha | 15.00 |
| Isopropyl alcohol | 24.00 |
| Silicone compound | 1.00 |
| Normal propyl alcohol | 5.00 |
| Normal propyl acetate | 5.90 |
| | 100.00 |

These polyamides are also compatible with nitro-cellulose and are soluble in the lower aliphatic alcohols, such as ethanol and isopropanol, while maintaining good solution stability after freeze-thaw testing.

While there is disclosed above but a limited number of embodiments of the invention herein presented, it is possible to produce still other embodiments, without departing from the inventive concept herein disclosed, and it is desired, therefore, that only such limitations be imposed on the appended claims as are herein stated.

What is claimed is:

1. A polyamide composition having a functionality of from about 1.8 to 2.0 comprising the reaction product of a mixture of polycarboxylic acids having a major proportion of dimeric linoleic acids, an ethylene diamine, said mixture of dimeric acids and ethylene diamine being present in sufficient amounts to provide a ratio of carboxyl groups to amine groups of from 0.6 to 0.9; and a chain terminating agent selected from the group consisting of hydrogenated phthalic acid, hydrogenated phthalic anhydride, tetrahydrophthalic acid, tetrahydrophthalic anhydride, hexahydrophthalic acid and hexahydrophthalic anhydride, said agent being present in an amount to provide a ratio of carboxyl groups to amine groups of from 0.05 to 0.3.

2. The composition of claim 1 wherein the chain terminating agent is a hydrogenated phthalic anhydride.

3. The composition of claim 1, wherein the chain terminating agent is tetrahydrophthalic anhydride.

4. The composition of claim 1, wherein the chain terminating agent is hexahydrophthalic anhydride.

5. The composition of claim 1 wherein the chain terminating agent is a hydrogenated phthalic acid.

6. The composition of claim 1 wherein the chain terminating agent is tetrahydrophthalic acid.

7. The composition of claim 1 wherein the chain terminating agent is hexahydrophthalic acid.

8. A process for the production of a polyamide which comprises heating to a reaction temperature an aliphatic polycarboxylic acid having from 8 to 24 carbon atoms per molecule, and a polyamine having the formula $H_2N(RNH)_xH$ wherein R is an alkylene radical having from 1 to 8 carbon atoms and $x$ is an integer from 1 to 6 in the proportion of about 1 mol of polycarboxylic acid to 1.4 mols of polyamine to produce the polyamide, heating the polyamide at a temperature of from 100 to 250° C. for a period of from 2 to 6 hours to polymerize the same, and further polymerizing the polyamide so formed with a chain terminating agent selected from the group consisting of hydrogenated phthalic acid, hydrogenated phthalic anhydride, tetrahydrophthalic acid, tetrahydrophthalic anhydride, hexahydrophthalic acid, and hexahydrophthalic anhydride.

9. The process of claim 8 wherein the chain terminating agent is hydrogenated phthalic acid.

10. The process of claim 8 wherein the chain terminating agent is hydrogenated phthalic anhydride.

11. The process of claim 8 wherein the chain terminating agent is hexahydrophthalic acid.

12. The process of claim 8 wherein the chain terminating agent is hexahydrophthalic anhydride.

13. The process of claim 8 wherein the chain terminating agent is tetrahydrophthalic acid.

14. The process of claim 8 wherein the chain terminating agent is tetrahydrophthalic anhydride.

References Cited

UNITED STATES PATENTS

| 2,174,527 | 10/1939 | Peterson | 260—78 |
| 3,268,461 | 8/1966 | Jacobson | 260—404.5 |

FOREIGN PATENTS

| 535,421 | 4/1941 | Great Britain. |

NICHOLAS S. RIZZO, *Primary Examiner.*

F. A. MIKA, *Assistant Examiner.*